Figure 6:
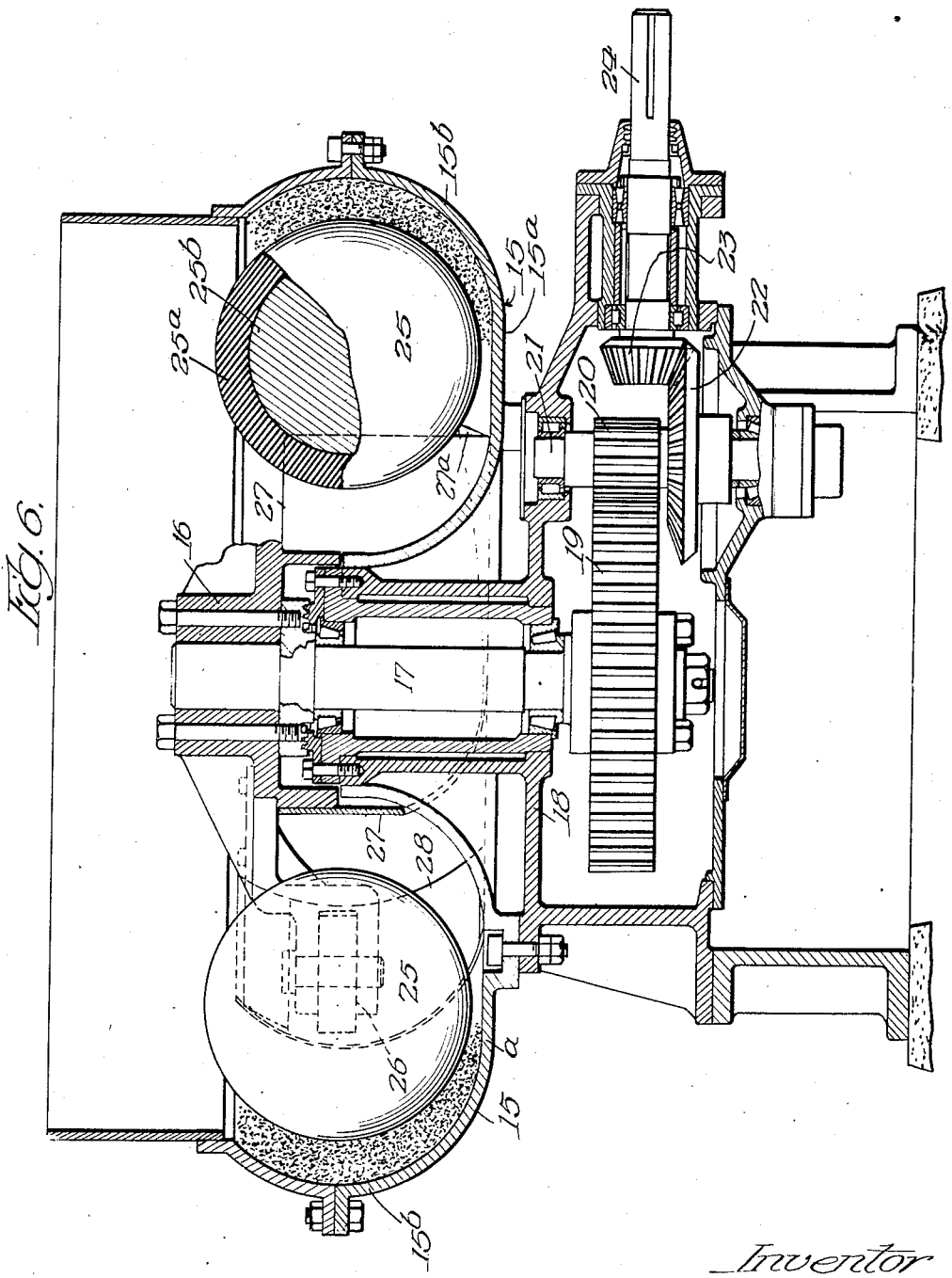

Jan. 24, 1939.  W. F. PIPER  2,144,636
METHOD OF TREATING MULLING SAND
Filed April 5, 1937  3 Sheets-Sheet 1
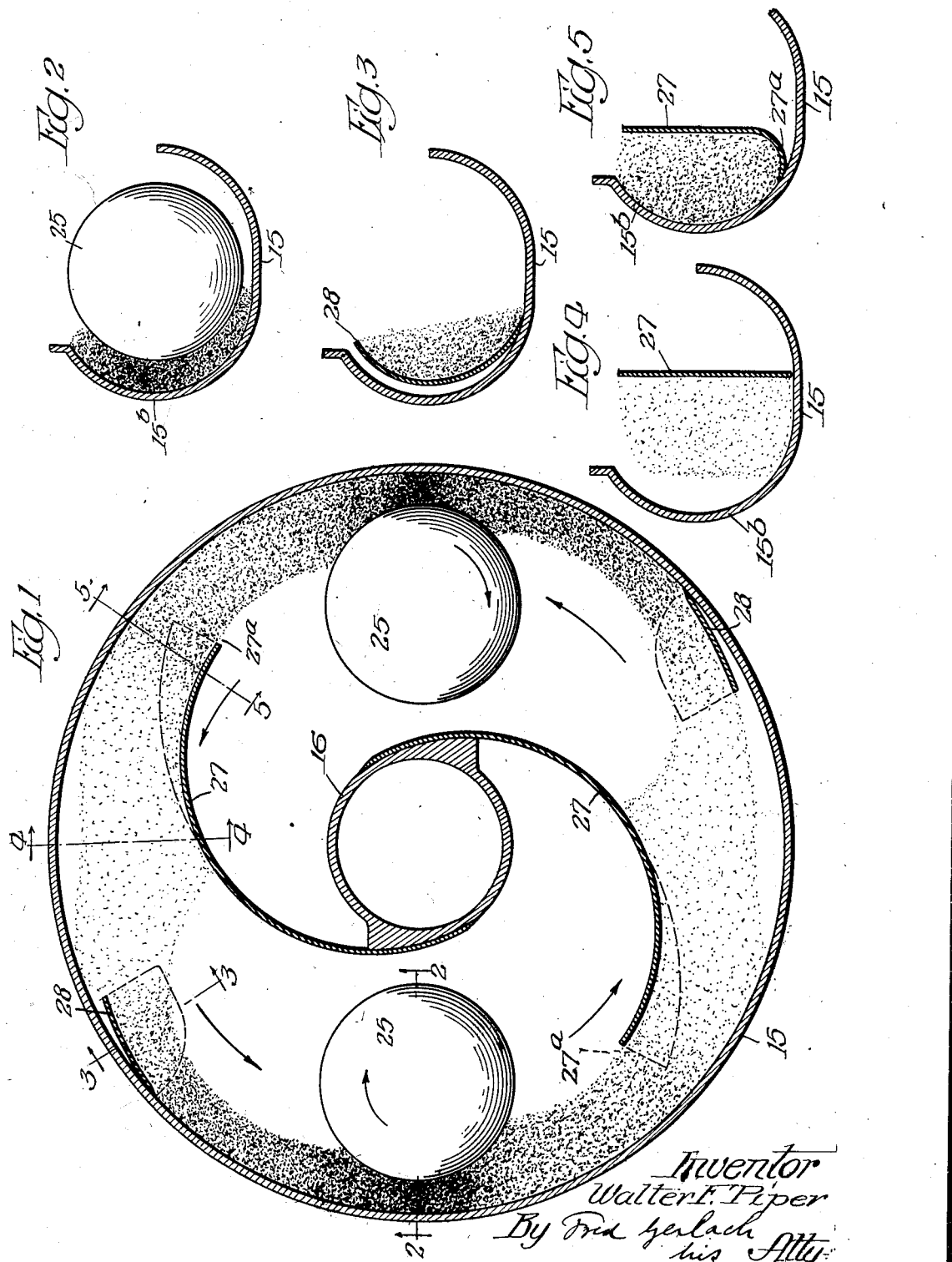

Jan. 24, 1939.　　　　W. F. PIPER　　　　2,144,636
METHOD OF TREATING MULLING SAND
Filed April 5, 1937　　　3 Sheets-Sheet 2

Inventor
Walter F. Piper
By Fred Gerlach
his Atty

Jan. 24, 1939. W. F. PIPER 2,144,636
METHOD OF TREATING MULLING SAND
Filed April 5, 1937 3 Sheets-Sheet 3
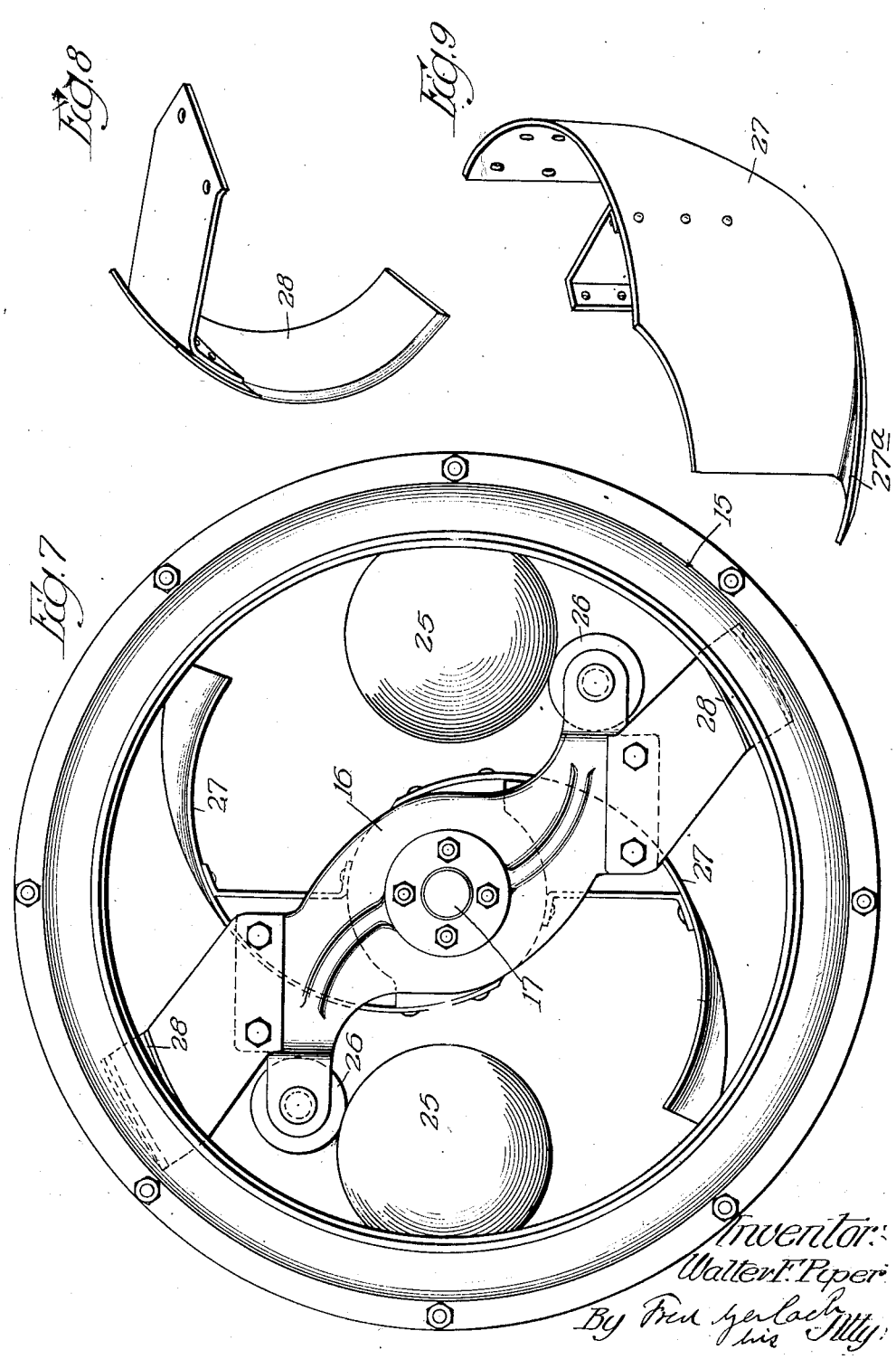

Patented Jan. 24, 1939

2,144,636

UNITED STATES PATENT OFFICE 2,144,636

METHOD OF TREATING MULLING SAND

Walter F. Piper, Oak Park, Ill., assignor to The Beardsley & Piper Company, Chicago, Ill., a corporation of Illinois Application April 5, 1937, Serial No. 134,974

14 Claims. (Cl. 22—217)

The invention relates to mulling sand for founding. In the preparation of sand for molds for founding, it is necessary to mechanically mix the sand or grains of silica with a bonding material, such as an emulsion of clay and water, a synthetic binder and water, molasses or oil. A desideratum in this treatment is to coat each grain of silica as uniformly as possible with a thin film of the bonding material sufficient to give the mass the necessary stability for molding without reducing the permeability below that necessary to permit the escape of gases from the metal while it is in the mold. Sand having the requisite stability with the minimum of bonding material uniformly distributed on the grains and with the requisite permeability, will produce castings of a high quality.

Heretofore, in mulling sand, it has been the practice to keep the sand in a compact mass on the bottom of a receptacle or drum and to squeeze a portion or portions thereof between the bottom and muller wheels and to use plows or deflectors to move the mass into the path of the mullers. In this practice, the relative movement between the grains of sand is limited to that produced by the squeezing and the plows used to direct the mass to the mullers. The necessity of directing and keeping the material under the muller-wheels so it will be squeezed definitely limits the speed at which the mullers can be operated. This limitation on the speed, results in a corresponding increase of the time required for the mulling of a batch of sand.

In this prior practice, it was also necessary to continue the squeeezing operation of a batch of sand for a sufficient period to produce the necessary distribution of the bonding material for the required bond-strength or stability when rammed in a flask. This also placed a definite limitation on the time required for mulling.

It has been found that aeration of the sand by forcible projection through the air will separate the grains and disintegrate the clusters of sand bonded together and will assist in more uniformly distributing the bonding material over the grains of sand and, for this purpose, it has been the practice to subject the sand to a separate operation in a screening and aerating machine. The performance of these mulling and aerating operations with separate machines further increased the period of time required and the cost of completely conditioning the sand for molds.

One object of the invention is to provide an improved method of conditioning sand for founding by which the sand and the bonding agent are alternately squeezed together or mulled and aerated or projected through the air with sufficient force to separate the grains of the clusters of sand to effect a more thorough and uniform distribution of the bonding material throughout the mass and to provide sand of the required permeability and bond-strength or stability.

Another object of the invention is to provide an improved method of conditioning sand in which the mixed bonding material and sand are mulled and aerated by a single continuous treatment.

Another object of the invention is to provide an improved method by which the mulling of sand and the uniform distribution of the bonding agent on the grains of the sand can be achieved in much less time than was heretofore possible.

In attaining these objects, the sand and bonding material are confined in a receptacle and the mullers and plows or deflectors are operated at a sufficiently high speed to cause the sand to be projected with sufficient force and speed to aerate it and break up the clusters therein after each squeezing; the mullers and plows are adapted, with the receptacle, to control the mass of sand so as to cause substantially all portions of the mass to be mulled and aerated at least once, and preferably twice, during each revolution of the mulling elements; the receptacle and mullers are adapted to confine and direct the mass for squeezing at the high speed of operation desired; and the sand is kept in suspension on a sand-track which is formed on an annular concave side of the drum.

The alternate and repeated squeezing and aeration of the confined sand and bonding material results in a very thorough and uniform distribution of the bonding material on the grains of sand to give the sand, when rammed in a flask, the desired permeability and bond stability. The high speed operation of the mullers and plows and the confinement of the sand so substantially the entire charge will be repeatedly squeezed and aerated during each revolution, and the squeezing of the sand while it is in suspension, result in thorough conditioning of the sand in the shortest possible period of time and in effecting a substantial saving in the cost of the treatment of the sand. In carrying out the entire treatment in a single machine, a substantial saving of cost is effected over separate mulling and aeration and the disadvantages thereof are overcome.

Other objects of the invention will appear from the detailed description.

The invention consists in the several novel features which are hereinafter set forth and are more particularly defined by claims at the conclusion hereof.

In the drawings: Fig. 1 is a diagrammatic plan illustrating the method of the invention. Fig. 2 is a section on line 2—2 of Fig. 1. Fig. 3 is a section on line 3—3 of Fig. 1. Fig. 4 is a section on line 4—4 of Fig. 1. Fig. 5 is a section on line 5—5 of Fig. 1. Fig. 6 is a vertical section of a machine adapted for carrying out the method. Fig. 7 is a plan of the machine. Fig. 8 is a perspective of one of the plows or projectors for deflecting the squeezed sand and scattering it so it will be aerated between squeezes. Fig. 9 is a perspective of one of the deflectors for gathering together the scattered grains of sand and directing them into the path of a muller-ball.

The treatment of the sand with bonding material and moisture, which forms the present invention, is diagrammatically illustrated in Figs. 1 to 5. An exemplification of a machine which may be used for carrying out the invention is illustrated in Figs. 6 to 9, inclusive. This machine comprises: a horizontally arranged drum or receptacle 15 having a straight bottom 15ª and a concavely curved side 15ᵇ which forms an annular vertically curved or arcuate muller-bed or sand-track; a rotatable head 16 fixed to a vertical shaft 17 which is suitably journaled in a supporting-frame 18; speed reducing gearing comprising a gear 19 fixed to shaft 17, a pinion 20 fixed to a vertical counter-shaft 21 which is journaled in frame 18, a bevel-gear 22 fixed to shaft 21 and a bevel-pinion 23 fixed to a horizontal shaft 24 which is adapted to be driven at high speed directly from an electric motor; a pair of oppositely disposed spherical mullers 25 each having its periphery conforming substantially to the curvature of the concave side 15ᵇ of the drum 15; rollers 26 carried by the head 16 for pushing the balls 25 around the receptacle while leaving them free to roll around the sand-track of the drum, being rotated on their own substantially vertical axes by friction with the sand; curved deflectors 27 which are secured to rotate with head 16 to direct the loose and scattered sand in advance of the muller-balls toward the concave wall 15ᵇ of the drum a short distance in advance of the muller-balls 25; and plows or projectors 28 which are secured to rotate with head 16 and are positioned to rotate rearwardly of or trail the muller-balls 25 and shaped to project and scatter inwardly the sand which has been compacted and squeezed together by the immediately preceding muller-balls. Each deflector 27 is provided at its lower edge with an outturned and upturned flange or nose 27ª which scoops the sand from the straight bottom portion 15 of the receptacle and directs it to the muller-track or space between the balls and the receptacle, where the sand will be squeezed or mulled. The plow or projector 28 has a front curved edge conforming to the inner periphery of the concave side 15ᵇ of the drum and extends obliquely and inwardly to project the sand which has been squeezed against said side, inwardly and to scatter and separate the grains from one another. This deflection directs some of the sand into the path of the curved front face of the immediately following deflector 27. The deflectors 27 and plows 28 are rotated synchronously with the muller-balls and are driven at a sufficiently high speed to hold substantially all of the sand of a batch in suspension in an annular stream, around the inner periphery of the annular concave side 15ᵇ of the drum.

In achieving the objects of the invention for carrying out the method, this may be done, by way of an example, with a receptacle having a maximum internal diameter of approximately five feet; muller-balls and plows and scrapers rotating at approximately 90 R. P. M.; muller-balls approximately 16 inches in diameter, consisting of a metal center about 12 inches in diameter and a covering of rubber of the density of a rubber tire about two inches in thickness, with a total weight of approximately 200 pounds; and a charge of seven cubic feet of sand. When driving the head 16 at 90 R. P. M., the balls will have a surface speed of approximately 1350 feet per minute at the maximum diameter of the drum or receptacle. Each muller-ball in motion while being pushed around the receptacle or drum at 90 R. P. M. and under centrifugal force, exerts approximately a pressure of about 825 pounds on the stream of sand between the ball and the concave side of the drum when the drum is charged with seven cubic feet of sand. The average thickness of the sand between the muller-balls and the receptacle is approximately ³⁵⁄₁₀₀ of a foot. The rubber facings on the balls grip the sand frictionally and, because of such gripping, cause the balls to rotate without building up piles in front of them or sliding through such piles. The effective muller-track area is approximately 20 square feet. Computing the pounds energy transmitted to the sand per minute as effective muller-track area, times the average depth of the sand, times R. P. M. of the plows, deflectors and bodily rotation of the muller-balls, times the total weight of the muller-balls in motion, the pounds energy transmitted to the sand per minute is 1,039,500 (20×.35×90×1650).

In treating sand with this equipment, speed of operation, and a charge of seven cubic feet of sand with a bonding material and moisture added, dumped into the drum, the method of treatment will be as follows: the speed (90 R. P. M.) of the deflectors 27, plows 28 and muller-balls 25 will be sufficiently high to keep all of the sand in suspension in the drum; the deflectors 27 in advance of the muller-balls will, in their rotation, continuously direct the sand toward the concave side 15ᵇ of the drum, as illustrated in Figs. 4 and 5, first moving the sand and bonding material which lies adjacent the center of the drum, outwardly and then, with its out-turned and up-turned bottom flange 27ª, scooping the sand from the bottom portion of the drum to the annular concave sand-track of the drum. Under the speed of rotation stated, the sand and bonding material will remain in suspension adjacent the concave side of the drum between the trailing end of each deflector 27 and the muller-ball which follows it, as indicated in Fig. 4. The sand will be projected outwardly with sufficient force to keep the stream of sand in suspension close to the concave side wall of the drum until the following muller-ball becomes effective on the stream. This projection of the sand or deflection under high speed produces a high degree of relative movement between the grains of sand and contributes substantially to the distribution of the bonding material around the grains of sand. As each ball which is moved bodily at the rate of 90 R. P. M., rotates freely on its axis and under its own weight and centrifugal force, it will squeeze and compact the sand between its periphery and the concave side-wall of the drum, as illustrated in Fig. 2. Substantially all of the sand stream is confined to the arcuate track area by the balls so that the sand and bonding agent will be squeezed together to uniformly distribute the bonding material around the grains of sand. The sand stream will be squeezed to a thickness of approximately .35 foot at the maximum diameter of the drum or receptacle. The friction facings of the balls as they rotate on their own vertical axes by reason of the frictional engagement with the sand, will cause the inner portion of the sand stream to be frictionally gripped and dragged between the peripheries of the balls and the concave inner face of the drum, and this aids the subjecting of the entire stream to pressure or squeezing by each muller-ball as it traverses the sand-track. The projector plows 28 rotate behind the muller-balls, and their front edges scrape substantially the entire inner periphery of the concave sand-track of the drum and at a speed of approximately 90 R. P. M., the plows forcibly project the sand stream after it has been squeezed by the muller-balls, toward the center of the drum. The high speed of rotation of the plows 28 causes the sand stream to be projected away from the side-wall of the stream and inwardly of the muller-track. The plows strike the stream with sufficient force to forcibly project the grains of sand so they will be separated and aerated, as indicated in Fig. 1, the sand of the stream being separated or scattered to such an extent that it will be scattered almost throughout the entire area between the side-wall of the drum and the outer faces of the deflectors 27. This projection and scattering of the sand effectively breaks up any clusters of sand which result from squeezing and produces relative movement between the grains of sand which tends to further and more uniformly distribute the bonding material around the individual grains of sand. After the projection and scattering of the sand by the plows 28, it is again condensed by the deflectors 27 and delivered to the succeeding muller-ball for another squeezing operation. This treatment of the sand is continued for a period of approximately 45 seconds in the machine having the capacity and speed of operation described. At the end of this period the sand will be properly conditioned for use in molds. The sand will then be discharged from the drum through a suitable door.

This method of conditioning molding sand involves confining a predetermined quantity or batch of sand and bonding material; the projection and control of the sand to keep it in suspension against a vertically extending concave sand-track; alternately squeezing the sand and bond material and forcibly projecting the sand after it has been squeezed to scatter and aerate it; then condensing and delivering the scattered sand back to the muller-track for repetition of the squeezing and aeration. The plows, deflectors and muller-balls are operated at a sufficiently high speed to keep all of the sand moving and in suspension and in a generally annular stream so that during each revolution all of the sand will be at least twice squeezed, projected, scattered, aerated and condensed and delivered back to the muller-track.

As a result of this treatment, a batch of seven cubic feet of sand with bonding material for the short period of approximately 45 seconds, will effect a uniform and thorough distribution of the bonding material around the grains of sand, so that it will, when placed in a mold, have the bond-strength or stability and permeability for producing castings of high quality.

With this method of treating molding sand, a batch of seven cubic feet of steel facing sand, for example, can be adequately treated for the distribution of the bonding material in a run of approximately 45 seconds, which is much quicker than any method of mulling heretofore practised, within my knowledge. Sand for grey iron and non-ferrous founding can be mulled in less than 45 seconds. Besides effecting the economy resulting from the speed of the treatment, the method results in a more thorough and uniform distribution of the bonding material around the grains of sand than that which results from any practice within my knowledge.

The green sand compression strength of steel facing sand produced in accordance with the present invention, averages approximately 4.2 pounds per square inch and the dry sand compression strength of the treated sand averages approximately 80 pounds per square inch while, in the most efficient mulling apparatus heretofore known, the green sand compression strength produced averages approximately 3.8 pounds per square inch and the dry sand compression strength produced averages approximately 70 pounds per square inch. Computing the pounds energy transmitted to the sand per minute by the present invention is approximately 2½ times the pounds average transmitted to the sand per minute by the methods heretofore most extensively used. The compression strength of dry sand, when mulled according to the present method, has been found to be higher than that which results in the mulling method now generally used. The present method requires materially less bonding material than sand mulled in methods heretofore used because of the more uniform distribution of the bond effected through the speed used in continuously and repeatedly squeezing and aerating all of the sand and bonding material during each revolution of the mullers, deflectors and plows.

The speed, weights, sizes and volume of the batch delivered, hereinbefore referred to, have been stated by way of example, and not by way of limitation, since it is obvious that the method is adapted to attain similar results in the treatment of sand and bonding material with variation of the speed, weights, muller-track area, and capacity.

An important result of the use of mulling elements having rubber faces, is that at the high speeds contemplated by the present invention, the sand does not pile up in advance of the mulling elements and remains confined in the drum. In tests, it has been found that when steel balls are used, their faces quickly become polished and, in lieu of confining the sand of the stream to the desired annular course, it will, under high speeds, be piled up in front of the elements and some of it will be thrown out of the drum.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The method of mulling sand which comprises repeatedly squeezing sand with bonding material and projecting the sand through the air at sufficient speed to scatter it into a finely divided state and aerate it after each squeezing.

2. The method of mulling sand which comprises repeatedly squeezing sand with bonding material, projecting the sand through the air after it has been squeezed, at sufficient speed to scatter it into a finely divided state and aerate it, and gathering together the scattered sand after each squeezing.

3. The method of mulling sand which comprises confining a batch of sand and bonding material in a drum, repeatedly squeezing the sand and said material within the drum, projecting the sand through the air at sufficient speed to scatter it into a finely divided state so the grains will be aerated after each squeezing, and gathering the scattered sand together after each squeezing.

4. The method of treating mulling sand which comprises delivering sand with bonding material onto a vertically extending annular mulling surface, squeezing the sand against said surface, projecting the sand through the air to scatter it into a finely divided state after each squeezing and gathering together and delivering the scattered sand to the vertical surface after each projection.

5. The method of treating mulling sand which comprises squeezing on a concave vertically extending annular mulling surface, sand with bonding material against said surface by a convex mulling element, projecting the sand through the air to scatter it into a finely divided state after each squeezing and gathering the scattered sand and delivering it to the vertical surface after each projection.

6. That improvement in mulling sand which comprises confining a batch of sand and bonding material in a receptacle having a wall adapted to limit the sand against movement in the direction away from the axis of the receptacle, squeezing the sand against said wall by a mulling element within the receptacle, and delivering sand away from said axis and to said wall with the aid of centrifugal force developed in the receptacle.

7. The method of mulling sand which comprises repeatedly squeezing sand with bonding material, projecting the sand through the air after it has been squeezed at sufficient speed to scatter it into a finely divided state and aerate it, and gathering together the scattered sand after each squeezing with the aid of centrifugal force.

8. That improvement in mulling sand which comprises confining a batch of sand and bonding material in a receptacle having a vertically extending wall adapted to limit the sand in the direction away from the axis of the receptacle, squeezing the sand against said wall by a mulling element within the receptacle and having a conformably vertically extending mulling surface, and delivering sand away from said axis and to said wall with the aid of centrifugal force developed in the receptacle.

9. That improvement in mulling sand which comprises confining a batch of sand and bonding material in a receptacle having an annular concave vertically extending wall adapted to limit the sand against movement in direction away from the axis of the receptacle, squeezing the sand against said wall by a spherical mulling element within the receptacle and delivering sand away from said axis and to said wall with the aid of centrifugal force developed in the receptacle.

10. The method of mulling sand which comprises distributing annularly around a receptacle, a batch of molding sand with bonding material, squeezing the sand between an annular wall of the receptacle and a mulling element having a rolling engagement with the sand, and confining to the effective squeezing space between the wall and said element, substantially all of the sand in a cross-section of the annularly distributed sand.

11. The method of mulling sand which comprises distributing annularly around a receptacle a batch of molding sand with bonding material, squeezing between an annular wall of the receptacle and a mulling element having a rolling engagement with the sand, by relative rotation of the element and receptacle, confining to the effective squeezing space between the element and said annular wall substantially all of the sand in a cross-section of the annularly distributed sand, projecting substantially all of the sand in the squeezed cross-section away from the wall to scatter it into a finely divided state and gathering together and delivering substantially all of the cross-section of the squeezed sand and delivering it to the effective squeezing space.

12. The method of mulling sand which comprises distributing annularly around a receptacle, a batch of molding sand with bonding material, squeezing the sand between an annular concave wall of the receptacle and a spherical mulling element having a rolling engagement with the sand, and confining to the effective squeezing space between the concave wall and the spherical element substantially all of the sand in a cross-section of the annually distributed sand.

13. The method of mulling sand which comprises distributing a batch of sand with bonding material on a vertically extending concave annular mulling surface in a receptacle and squeezing the sand on said surface and above the bottom of the receptacle by a spherical rotatable mulling element.

14. The method of mulling sand which comprises distributing to a vertically extending mulling surface in a receptacle, sand with bonding material and squeezing the sand on said surface by a spherical mulling element having a resilient friction face for gripping the sand on said surface.

WALTER F. PIPER.